United States Patent [19]

Bird et al.

[11] 4,375,550

[45] Mar. 1, 1983

[54] HYDROGENATION OF HALOGEN-SUBSTITUTED AROMATIC NITRO COMPOUNDS

[75] Inventors: Alfred J. Bird, Hounslow; Gordon G. Ferrier, Henley on Thames, both of England

[73] Assignee: Johnson, Matthey & Co., Limited, London, England

[21] Appl. No.: 296,880

[22] Filed: Aug. 27, 1981

Related U.S. Application Data

[62] Division of Ser. No. 122,820, Feb. 19, 1980, abandoned.

[30] Foreign Application Priority Data

Feb. 22, 1979 [GB] United Kingdom ................. 7906269

[51] Int. Cl.³ ..................... C07C 101/54; C07C 85/11
[52] U.S. Cl. ........................ 560/47; 560/22; 562/437; 562/456; 564/417
[58] Field of Search .......................... 564/417; 560/47; 562/456

[56] References Cited

U.S. PATENT DOCUMENTS 3,474,144 10/1969 Craig et al. ...................... 564/417
3,761,425 9/1973 Baessler et al. ..................... 564/417
4,020,107 4/1977 Kosak ................................ 564/417

FOREIGN PATENT DOCUMENTS 2156051 5/1973 Fed. Rep. of Germany ...... 564/417
1498722 1/1978 United Kingdom ............... 564/417

OTHER PUBLICATIONS

Hassler, "Activated Carbon", p. 182, (1963).
Kosak, "Catalysis in Organic Syntheses", pp. 107–117, (1980).

Primary Examiner—John Doll
Attorney, Agent, or Firm—Cushman, Darby & Cushman

[57] ABSTRACT

This invention relates to the hydrogenation of halogen-substituted aromatic nitro compounds and in particular provides a novel catalyst for use in such processes.

In more detail a catalyst suitable for use in the hydrogenation of halogen-substituted aromatic nitro compounds substantially without simultaneous dehalogenation comprises one or more metals from the group consisting of platinum, palladium, rhodium, iridium, ruthenium and osmium supported on or impregnated into a carrier material comprising carbon activated with phosphoric acid or a salt thereof.

13 Claims, No Drawings

HYDROGENATION OF HALOGEN-SUBSTITUTED AROMATIC NITRO COMPOUNDS

This is a division of application Ser. No. 122,820 filed Feb. 19, 1980, now abandoned.

This invention relates to the hydrogenation of halogen-substituted aromatic nitro compounds and in particular provides a novel catalyst for use in such processes.

The hydrogenation of halogen-substituted aromatic nitro compounds to yield the corresponding anilines tends to proceed with simultaneous dehalogenation which reduces the yield of the desired aniline. Various means have been proposed to overcome this problem but all have necessitated the use of extra processing and/or catalyst preparation stages and hence have increased overall processing costs, and/or have been unsuitable for continuous operation, and/or have resulted in poor yields of desired product.

Prior art proposals have included the use of special catalyst supports, for example oleophilic carbons (U.S. Pat. No. 2,823,235) or a non-porous carbon admixed with an activated, porous carbon (U.S. Pat. No. 3,328,465), the use of rhodium as catalyst, for example on a finely divided inert inorganic carrier (U.S. Pat. No. 2,772,813) or promoted with calcium hydroxide (U.S. Pat. No. 3,051,753), the use of sulphided Group VIII metal catalysts (British Pat. No. 1,064,959), the use of catalysts such as copper oxide-chromic oxide (U.S. Pat. No. 2,791,613), platinum group metals modified by the addition of Pb, Bi or Ag (U.S. Pat. No. 3,666,813) or boron (British Pat. No. 1,453,966), or nickel modified with calcium or magnesium hydroxide or sodium or calcium carbonate or acetate (U.S. Pat. No. 3,067,253), and the use of special solvents or process additives such as glacial acetic acid (U.S. Pat. No. 3,150,185), an oxide or hydroxide of magnesium (U.S. Pat. No. 3,073,863), acidic phosphorus compounds (U.S. Pat. No. 4,020,107), cycloaliphatic nitrogen bases such as morpholine (U.S. Pat. No. 3,145,231), basically-acting alkaline earth metal compounds, for example calcium hydroxide, to control pH (British Pat. No. 1,320,129) and aliphatic, aromatic or heterocyclic amines (British Pat. No. 1,483,330).

It is an object of the present invention to provide a novel catalyst for the hydrogenation of halogen-substituted aromatic nitro compounds, which catalyst will avoid the disadvantages of prior art catalysts particularly with respect to cost and/or will enable an improved process for the hydrogenation of halogen-substituted aromatic nitro compounds to the corresponding anilines substantially without simultaneous dehalogenation to be achieved.

According to one aspect of the invention, a catalyst suitable for use in the hydrogenation of halogen-substituted aromatic nitro compounds substantially without simultaneous dehalogenation comprises one or more metals from the platinum group supported on or impregnated into a carrier material comprising carbon activated with phosphoric acid or a salt thereof. Preferably, the carbon is activated during manufacture with the phosphoric acid or a salt thereof.

According to a second aspect of the invention, a process for the hydrogenation of a halogen-substituted aromatic nitro compound comprises contacting a halogen-substituted aromatic nitro compound with hydrogen at elevated temperature and pressure in the presence of a catalyst comprising one or more metals of the platinum group supported on or -4-bromonitro-benzene; 2,6-dichloro-4-nitrophenol; 4-chloro-2-nitroanisole; 4-chloro-1-nitronaphthalene; 4-chloro-2,6-dinitrobenzene; 4-chloro-3,5-dinitrobenzoic acid or an ester thereof; 3-chloro-3'-nitro-diphenyl; 2-chloro-4-nitroaniline; 6-chloro-2-nitro-sodium benzoate; 4-chloro-3-nitrobenzene sodium sulfonate etc. Isomers and mixtures of isomers of the above may also be used.

By "elevated temperature" we mean a temperature within the range 50°–200° C., preferably 90°–120° C., and by "elevated pressure" we mean a pressure greater than 1 and up to 70 atmospheres preferably 6–15 atmospheres.

The process according to the invention may be operated in the absence or in the presence of solvents. Suitable solvents include alcohols such as methanol, ethanol and isopropanol, hydrocarbons such as benzene and toluene, the chloroanilines corresponding to the reaction product, water and so on.

It is a feature of the process according to the invention that no additives, especially no organic or inorganic bases, are required to be added to the reaction mixture.

The novel catalyst according to the invention comprises from 0.1 to 10 wt.% of platinum group metal deposited on or impregnated into a phosphoric acid-activated carbon support material. The preferred loading of catalytic metal is in the range 0.5–5 wt.%, for example 1.0% by weight of platinum. Suitable phosphoric acid-activated support materials are commercially available. An example is "Actibon C", manufactured and sold by Norit Clydesdale Limited of the UK. The platinum group metal may be applied to the support material by methods known to those skilled in the art. The catalyst may be used as a dry powder or as a paste catalyst containing water, the preferred solids content of the paste being 30–60%, more preferably 40% (i.e. 60% water). The catalyst according to the invention and comprising 1% by weight of platinum on phosphoric acid-activated carbon must contain fixed—that is, non-extractable—phosphorus from 0.1–10.0% by weight, present as phosphorus incorporated into the structure of the carbon. The total phosphorus content, both fixed and extractable, of catalysts according to the invention when used as a 40% solids paste, for example, is typically in the range 0.15–20% based on carbon.

One of the important aspects of this catalyst is that it will operate at very low catalyst to substrate ratios. This ratio is obviously very dependent on the amount of catalytically poisonous materials present in the starting material. Some starting materials, because of the methods of manufacture and the degree of subsequent purification which will depend on the use to which the starting material will be put, are exceptionally pure and in these cases the catalyst to substrate ratio may be as low as 0.01% without any serious effect on the selectivity of the catalyst, although the rate of hydrogenation will be low. The upper catalyst to substrate ratio is determined by the degree of polymerisation of the nitro-body which takes place during very fast reduction. Such polymerisation can lead to very large exotherms which can result in explosions or serious damage to expensive equipment. To a large extent, such exotherms are initiated by the heat occasioned by hydrogenation which obviously is larger the greater the amount of catalyst present per unit of nitrobody. The degree of polymerisation is also a function of the starting material. Some starting materials are less prone to polymerisation than others and catalyst to substrate ratios of up to 10% can be tolerated. However, for most operations, the preferred catalyst to substrate ratio is between 0.2% and 5.0%. Catalyst to substrate ratios are quoted as weight of dry catalyst to weight of substrate.

The process of the invention will now be described with reference to the following examples, which are generally applicable to the hydrogenation of halogen-substituted nitro compounds.

Preparation of a catalyst according to the invention on a phosphoric acid activated charcoal is described in Example 1, while that of a prior art catalyst on a steam activated charcoal is given in Example 5. The remainder of the Examples, i.e. Examples 2 through 4 and 6 through 34, describe the operation of the catalyst in the hydrogenation of halonitro aromatics to halo aromatic amines in two distinct types of reactor. For Examples 2 through 4 and 6 through 16, use is made of a rotary stirred glandless autoclave to simulate conditions of hydrogenation found on much larger scale industrial plant while Examples 17 through 34 are conducted on a shaken autoclave typical of the type of equipment used industrially for hydrogenations of small capacity up to about 20 gallons.

Taking firstly the Examples of hydrogenations conducted on the rotary stirred autoclave, they describe more particularly the method of hydrogenation of 2-chloro-nitrobenzene (Example 2) with a repeat hydrogenation in Example 3. Example 4 illustrates the effect of changing the degree of agitation on the hydrogenation of 2-chloro-nitrobenzene while Examples 6 and 7 illustrate the effect of using prior art catalysts at 1% platinum and 5% platinum loading on a steam activated charcoal in this hydrogenation. The effects of changing operating variables are described in Example 8 (temperature), Examples 9 and 10 (catalyst weight) and Example 12 (pressure). Example 11 illustrates the hydrogenation of 2-chloro-nitrobenzene with a catalyst prepared by the method of Example 1 on a 10 Kg scale. The hydrogenation of other substrates is given in Example 14 (3,4-dichloro-nitrobenzene) Example 15 (1 bromonitrobenzene) and Example 16 (2 chloro-6-nitrotoluene).

With the shaken reactor hydrogenations, Example 17 gives the method of hydrogenation using the catalyst made according to Example 1, and Example 18 shows the effect of conducting the hydrogenation with a prior art catalyst prepared according to Example 5 using 2-chloro-nitrobenzene as substrate. Example 19 exemplifies the use of a catalyst of the invention with 2,5 dichloro-nitrobenzene as substrate and Example 20 to 27 show how variation of the operating variables affect the hydrogenation of this substrate; Examples 20 and 21 (agitation), Examples 22 and 23 (temperature), Examples 24, 25 and 26 (catalyst weight) and Example 27 (pressure). The hydrogenation of other substates is given in Example 28 (2-fluoro-nitrobenzene), Example 29 (4-fluoro-nitrobenzene), Example 30 (2,4-difluoronitrobenzene), Examples 31 and 32 (2 chloro-4-nitrotoluene) Example 33 (2-chloro-6-nitro-toluene). Example 34 illustrates the effect of using the upper catalyst to substrate loading. Finally, Example 35 illustrates the use of solvent in the process of the invention.

EXAMPLE 1

This Example is given by way of illustrating one method of preparation and should not be construed as excluding other methods of preparation well known to those skilled in the art. 100 gms phosphoric acid activated charcoal was suspended in 1 liter of water with mechanical agitation. To this suspension was added 1 gm platinum as chloroplatinic acid in 50 mls water, and 10 gm sodium hydroxide in 50 mls water. The whole was agitated with a mechanical stirrer for 15 minutes then the temperature was raised to the boil and 10 mls 40% formaldehyde solution added. Boiling was continued for 45 minutes. At the end of this time, the catalyst was filtered and then resuspended in 1 liter of water. Glacial phosphoric acid was then added to the suspension until the pH reached 2. Agitation was continued for 30 minutes when the catalyst was filtered and washed until the pH of the washings reached pH 5. The catalyst is normally stored as a water wet paste containing about 60% water. If dry catalyst is required it may be dried at 110° C. in an air oven.

EXAMPLE 2

157.6 gms 2-chloro-nitrobenzene was placed in the pot of a liter glandless rotary autoclave, together with 2.54 gms 1% platinum on charcoal catalyst paste (60% water) (a loading of catalyst to nitro body of 0.63%) prepared in a manner similar to that in Example 1. The autoclave top was bolted into position and connected to a hydrogen/nitrogen manifold. The autoclave was then flushed twice with nitrogen (50 psig), then twice with hydrogen (50 psig) and then again with hydrogen (100 psig) and finally filled with hydrogen to a pressure of 110 psig (7 atm). The temperature was raised 90° C., the stirrer being started at 100 rpm once the melting point of the 2-chloro nitrobenzene had been exceeded (40° C.). Once this temperature had been attained, the pressure of hydrogen was increased to 160 psig. (approx. 10½ atm) and the stirring rate was increased to 500 rpm to start the reaction. The pressure gradually fell as hydrogen was consumed and the time was recorded for the pressure to reach 140 psig (approx 9 atm); the autoclave was then repressurised to 160 psig. This cycle was repeated until no more hydrogen was taken up when a total time of 405 minutes had elapsed.

The pressure was then lowered to atmospheric and the aqueous and organic layers of the reaction mixture were separated and filtered to remove catalyst. The aqueous phase was rendered alkaline with sodium bicarbonate and any water soluble aniline hydrochloride (now converted to aniline) was extracted with ether, dried, the ether evaporated off and the residue weighed and combined with the bulk organic phase which had been dried over anhydrous magnesium sulphate. Analysis by g.l.c. determined the conversion and selectivity (that is, the ratio of desired 2-chloro aniline product to total products) using a 5 ft glass column packed with 10% carbowax 20 M on 80–100 mesh supelcoport at a temperature between 463° and 493° K. The carrier gas was nitrogen at 30 psig. The organic components eluted from the glc column were detected by a flame ionisation detector.

From the glc analysis it was determined that the conversion of 2-chloro-nitrobenzene was 100% with a selectivity of 99.0% to 2-chloroaniline, the desired product, with the formation of only 1% aniline hydrochloride.

EXAMPLE 3

The hydrogenation of Example 2 was repeated with 157.6 gm 2 chloro-nitrobenzene and 2.54 gm 1% platinum on charcoal catalyst paste. When hydrogen uptake ceased the total elapsed time was 410 minutes. Conversion of 2-chloro-nitrobenzene was 100% and selectivity was 99.0% to 2-chloro aniline.

EXAMPLE 4

The hydrogenation of Example 2 was repeated with 2.54 gm 1% platinum on charcoal catalyst paste except that the agitator was rotated at 1000 rpm during the period of hydrogen absorbtion. Hydrogen uptake ceased at 100 minutes, and analysis showed that the conversion was 100% and selectivity to 2 chloro aniline was 99.5%.

EXAMPLE 5

(Example of prior art catalyst preparation)

100 gms steam activated charcoal was suspended in 1 liter of water with mechanical agitation. To this suspension was added 1 gm platinum as chloro-platinic acid in 50 mls water, and 10 gm sodium hydroxide in 50 mls water. The whole was agitated with a mechanical stirrer for 15 minutes then the temperature was raised to the boil and 10 mls 40% formaldehyde solution added. Boiling was continued for 45 minutes. At the end of this time the catalyst was filtered and washed free of chloride ion as shown by allowing a few drops of the filtrate to react with 5 mls 2% silver nitrate solution acidified with nitric acid and observing no white precipitate of silver chloride. The filter cake was then stored as a paste containing 60% water. If it is required as a dry powder the catalyst may be dried in an air oven at 100° C. for 24 hours.

EXAMPLE 6

(Comparative Example with prior art catalyst)

Example 4 was repeated except that the 1% platinum on charcoal catalyst was made according to Example 5 on a steam activated charcoal. The weight of catalyst paste used was 2.67 gm (a catalyst to nitro body loading of 0.7%). Hydrogen absorption ceased at 101 minutes and analysis showed that conversion was 100% but the selectivity of the hydrogenation of 2-chloro nitrobenzene to 2-chloro aniline was only 66.0%.

EXAMPLE 7

(Comparative Example with prior art catalyst)

Example 6 was repeated except that the catalyst used was a 5% platinum on charcoal prepared according to the method given in Example 5 on a steam activated charcoal. The weight of catalyst used was 0.2 gm dry catalyst powder equivalent to a catalyst to nitrobody loading of 0.63% based on a 1% platinum on charcoal catalyst. Hydrogen uptake ceased abruptly after 100 minutes and analysis showed that the conversion of 2-chloro nitrobenzene to products was 100% with conversion to 2-chloroaniline being 81%, i.e. 19% aniline hydrochloride and other unwanted side products were formed.

EXAMPLE 8

The hydrogenation of Example 2 was repeated except that the temperature of hydrogenation was maintained at the higher temperature of 120° C.

Hydrogen absorption ceased after 534 minutes when conversion of 2-chloro nitrobenzene to products was 100% and selectivity to the desired 2-chloro aniline was 99.0%.

EXAMPLE 9

The hydrogenation of Example 8 was repeated with twice the weight of catalyst, namely 5.0 gm 1% platinum on phosphoric acid activated charcoal paste (60% water) (a loading of catalyst to nitro body of 1.3%).

Hydrogen absorption abruptly ceased after 350 minutes. Conversion of 2-chloro nitrobenzene to products was 100%, while conversion (selectivity) to 20chloro aniline was 99.0%.

EXAMPLE 10

The hydrogenation of Example 8 was repeated with half the weight of catalyst. 1.25 gm 1% platinum on phosphoric acid activated charcoal paste (60% water) was used and hydrogen absorption ceased after 1090 minutes. The conversion was 100% and selectivity to the desired product, 2-chloro aniline was 99.0%. The catalyst to nitrobody loading was 0.32%.

EXAMPLE 11

The hydrogenation of Example 4 was repeated with a catalyst made on a 10 Kg scale according to Example 1, on a phosphoric acid activated charcoal.

The weight of catalyst used was 2.65 gm 1% platinum on charcoal paste (60% water) equivalent to a catalyst to nitro body loading of 0.7%. The time required for complete hydrogenation was 220 minutes (100% conversion of 2-chloro nitrobenzene to products) and the selectivity to 2-chloro aniline was 99.0%.

EXAMPLE 12

The hydrogenation in Example 4 was repeated with 2.50 gm 1% platinum on charcoal catalyst paste, except that the pressure during hydrogenation was maintained at 300 psig.

Hydrogen absorption ceased abruptly after 40 minutes. Analysis of the product by gas-liquid chromatography revealed that the conversion of the 2-chloro nitrobenzene was complete (i.e. 100% conversion) while the selectivity to the desired product, 2 chloro aniline was 98.0%.

EXAMPLE 13

The hydrogenation of Example 4 was repeated with 4-chloro nitrobenzene as substrate and 2.54 gms catalyst paste prepared according to Example 1.

Hydrogen absorption ceased after 100 minutes and analysis of the products by gas-liquid chromatography showed that no 4-chloro nitrobenzene remained i.e. conversion was 100%. Selectivity to the desired 4-chloro aniline was 98.8%.

EXAMPLE 14

The hydrogenation of Example 4 was repeated with 3,4-chloro nitrobenzene as substrate and 2.54 gms catalyst paste prepared according to Example 1.

Hydrogen absorption ceased after 50 minutes. Analysis by gas-liquid chromatography revealed that no 3,4-dichloronitrobenzene remained, i.e. conversion was 100% and that selectivity to the desired product 3,4-dichloroaniline was 97.2%.

EXAMPLE 15

The hydrogenation of Example 4 was repeated with 202 gm 1-bromo-2-nitrobenzene as substrate. The catalyst used was 2.54 gm of 1% platinum on charcoal catalyst paste (60% water) prepared according to Example 1, a catalyst to nitrobody loading of 0.5%.

Absorption of hydrogen ceased after 105 minutes, and analysis of the product by gas-liquid chromatography indicated that conversion of the 1-bromo-2-nitrobenzene to products was 99.5% with selectivity of 97.6% to the desired product 2-bromoaniline.

EXAMPLE 16

The hydrogenation of Example 4 was repeated with 171 gm 2-chloro-6-nitrotoluene as substrate and 2.54 gms 1% platinum on charcoal catalyst paste (60% water), a catalyst to nitro body loading of 0.6%.

Hydrogen absorption ceased after 75 minutes and analysis by gas-liquid chromatography showed that conversion of 2-chloro-6-nitrotoluene to products was 99.8% while selectivity to the desired 2-chloro-6-toluidine was 94.4%.

EXAMPLE 17

79 gm 2-chloro-nitrobenzene was placed together with 0.98 gm 1% platinum on charcoal catalyst paste (60% water) as prepared in Example 1 into a 500 ml resctor of a shaken autoclave manufactured by Charles Cook & Son. This is equivalent to a catalyst to nitro body loading of 0.5%. The autoclave was sealed to a hydrogen-nitrogen manifold, and flushed three times with white spot nitrogen at 80 psig., then twice with hydrogen at 80 psig. The temperature was then raised to 100° C. and, once this temperature had been reached, the hydrogen pressure was increased to 148 psig. The reactor was then shaken at 250 cycles per minute as measured by a stroboscope. Hydrogen absorption was measured by a mass flow meter and recorded as a Y axis deflection on a flat bed chart recorder. The reaction was stopped when no further Y axis deflection was observed; this point was taken as the end of hydrogen absorption. The time taken for complete hydrogen absorption was 80 minutes.

The product from the hydrogenation was worked up as in Example 2, and analysed by gas-liquid chromatography. The conversion of 2-chloro-nitrobenzene was 100% and the selectivity to 2-chloro aniline was 99%.

EXAMPLE 18

(Comparative Example with prior art catalyst)

The hydrogenation of Example 17 was repeated with 0.98 gms 1% platinum on steam activated charcoal catalyst paste (60% water) an 0.5% catalyst to nitro body loading.

Hydrogen absorption ceased after 78 minutes and analysis of the product by gas-liquid chromatography revealed that no 2-chloro-nitro-benzene remained but that the selectivity of the desired product 2-chloro aniline was only 80%.

EXAMPLE 19

The hydrogenation of example 17 was repeated with 1.2 gm 1% platinum on charcoal catalyst paste (60% water) prepared as in example 1 and 96 gm 2,5 dichloro nitro benzene. This is equivalent to a catalyst to nitro body loading of 0.5% The temperature at which the hydrogenation was conducted was 110° C. and the pressure was 148 psig.

Hydrogen absorbtion ceased after 80 mins and analysis of the products of hydrogenation showed that conversion of the 2,5 dichloronitro benzene was 100% while selectivity of 99.2% to the desired 2,5 dichloroaniline was achieved. The 0.8% dehalogenated products was composed of 0.27% aniline, 0.18% O-chloroaniline and 0.35% m-chloroaniline.

EXAMPLE 20

The hydrogenation of example 19 was repeated exactly, except that the agitation rate was lowered to 200 cycles per minute.

Hydrogen absorbtion ceased after 175 minutes and analysis by gas-liquid chromatography revealed that the conversion of 2,5 dichloronitrobenzene was complete i.e. 100% conversion, and that selectivity to the desired product 2,5 dichloroaniline was 99.67% the 0.33% of dehalogenated product was composed of 0.04% aniline, 0.08% o-chloroaniline and 0.21% m-chloroaniline.

EXAMPLE 21

The hydrogenation of example 19 was repeated exactly except that the agitation rate was raised to 350 cycles per minute.

Hydrogen absorbtion ceased after 75 minutes and analysis by gas-liquid chromatography indicated that a conversion of 100% of the 2,5 dichloronitro benzene to products had taken place. The selectivity for the formation of the desired product, 2,5 dichloroaniline was 99.16%. The 0.84% of dehalogenated products was composed of 0.12% aniline, 0.19% o-chloroaniline and 0.53% m-chloraniline.

EXAMPLE 22

The hydrogenation of example 19 was repeated except that the temperature was lowered to 85° C.

Hydrogen absorbtion ceased after 190 minutes and analysis by gas-liquid chromatography showed that a conversion of the 2,5 dichloronitrobenzene of 100% had been achieved. Selectivity for the desired product, 25 dichloroaniline, was 99.48% with 0.52% dehalogenated products composed of 0.06% aniline, 0.07% o-chloroaniline and 0.39% m-chloroaniline.

EXAMPLE 23

The hydrogenation of example 19 was repeated except that the temperature was raised to 130° C.

Hydrogen absorbtion ceased after 66 minutes and analysis by gas-liquid chromatography indicated that no 2,5 dichloronitro benzene remained, i.e. 100% conversion. Selectivity for the desired 2,5 dichloroaniline product was 98.84% with 1.16% of dehalogenated products composed of 0.31% aniline, 0.24% o-chloroaniline and 0.61% m-chloroaniline.

EXAMPLE 24

The hydrogenation of example 19 was repeated with a lower catalyst weight of 0.6 gm 1% platinum on charcoal catalyst paste (60% water) prepared according to example 1, i.e. a catalyst to nitrobody loading 0.25%.

Hydrogen uptake ceased after 224 minutes and analysis by gas-liquid chromatography showed that a conversion of 2,5 dichloronitrobenzene to products of 100% had been achieved. The selectivity to the desired 2,5 dichloroaniline was 99.94% with only 0.06% o-chloroaniline as the sole dehalogenated product.

EXAMPLE 25

The hydrogenation of example 19 was repeated except that a higher weight of catalyst of 2.4 gm 1% platinum on charcoal catalyst paste (60% water) was used, i.e. a catalyst to nitrobody loading of 1.0%.

Hydrogen absorbtion ceased after 56 minutes with complete conversion of the 2,5 dichloronitro benzene to products. The selectivity for 2,5 dichloroaniline was 97.46% with 2.54% of dehalogenated products composed of 0.88% aniline, 0.51% o-chloroaniline and 1.15% m-chloroaniline

EXAMPLE 26

The hydrogenation of example 25 was repeated using 4.8 gm 1% platinum on charcoal catalyst paste (60% water), four times greater than in example 19.

Hydrogen absorbtion ceased after 43 minutes and analysis by gas-liquid chromatography showed that a conversion of the 2,5 dichloronitrobenzene was 100%. The selectivity to the desired 2,5 dichloroaniline product was 95.26% with 4.74% dehalogenated products composed of 2.07% aniline, 0.76% o-chloroaniline and 1.91% m-chloroaniline.

EXAMPLE 27

The hydrogenation of example 19 was repeated exactly, except that the pressure at which the hydrogenation was conducted was 74 psig.

The hydrogen absorbtion ceased after 220 minutes and analysis of the products by gas-liquid chromatography showed that a conversion of the 2,5 dichloronitrobenzene to products of 100% had been achieved. The selectivity for the desired product, 2,5 dichloroaniline was 98.4% with 1.6% dehalogenated products composed of 0.46% aniline, 0.51% o-chloroaniline and 0.59% m-chloroaniline.

EXAMPLE 28

The hydrogenation of example 17 was repeated with 3.53 gm 1% platinum on charcoal catalyst paste (60% water) and 70.6 gms 2-fluoro nitrobenzene a catalyst to nitrobody loading of 2.0%. The temperature was 105° C. with an imposed pressure of 148 psig.

Hydrogen absorbtion ceased after 268 minutes and analysis by gas-liquid chromatography showed that a conversion of 99.92% had been achieved. The selectivity for the desired product, 2-fluoroaniline was 99.8%.

EXAMPLE 29

The hydrogenation of example 28 was repeated with 4-fluoronitrobenzene as substrate.

Hydrogen absorbtion ceased after 360 minutes with 99.86% conversion of the starting material to the desired product 4-fluoroaniline, i.e. a selectivity of 100%.

EXAMPLE 30

The hydrogenation of example 17 was repeated with 79.5 gm 2,4 difluoronitrobenzene and 3.97 gm 1% platinum on charcoal catalyst (60% water) a loading of catalyst to nitro body of 2.0%.

Hydrogen absorbtion ceased after 55 minutes. Analysis by gas-liquid chromatography showed a conversion of 100% with a selectivity to the desired product, 2,4 difluoroaniline of 99.7%.

EXAMPLE 31

The hydrogenation of example 17 was repeated with 85.8 gm 2-chloro-4-nitro-toluene at 80° C. and 350 cycles per minute agitation. The weight of catalyst used was 4.0 gm equivalent to a catalyst to nitro body loading of 1.88%.

Hydrogen absorbtion ceased after 114 minutes and analysis of the products revealed a conversion of 99.95% with a selectivity to the desired 3 chloro-4-methyl aniline product of 99.6%.

EXAMPLE 32

The hydrogenation of example 31 was repeated with a different batch of 2-chloro-4-nitro toluene using 1.34 gms 1% platinum on charcoal catalyst paste (60% water) a catalyst to nitro body loading 40.63%.

Hydrogen uptake ceased after 50 minutes and analysis of the products revealed a conversion of the starting material to products of 99.98% selectivity to the desired 3-chloro-4-methylaniline was 98.6%.

EXAMPLE 33

The hydrogenation of example 17 was repeated with 85.8 gm 2-chloro-6-nitro toluene at 80° C. and 350 cycles per minute agitation. A catalyst weight of 1.34 gms 1% platinum on charcoal catalyst paste (60% water) was used.

Hydrogen absorbtion ceased after 55 minutes and analysis by gas-liquid chromatography of the products of hydrogenation showed that a conversion of the starting material of 99.78% had occurred with a selectivity to the desired product, 2 methyl-3-chloro aniline, of 97.5%.

EXAMPLE 34

The hydrogenation of example 19 was repeated using 12.0 gms 1% platinum on charcoal catalyst paste (60% water), 10 times greater than example 19, at 130° C. and 350 cycles per minute agitation. Hydrogen absorption was initially rapid and overheating due to the production of a large exotherm took place. After 10% of the normal hydrogen absorption, the reaction ceased and no further absorption took place. Inspection of the contents of the reactor revealed that polymerisation had occurred with the formation of tars. No further analysis was attempted.

EXAMPLE 35

20 mls of a 6.3% w/v solution of 2,5 dichloro nitrobenzene in isopropanol was placed together with 0.0546 gm 4% platinum on charcoal catalyst (60% water) prepared according to the method given in example 1, in an 80 ml glass reaction vessel. This is equivalent to a catalyst to nitrobody loading of 7.0% based on a 1% platinum on charcoal catalyst. The reaction vessel was clamped to a standard laboratory shaken in such a manner as to allow the glass reaction vessel to be partially immersed in an oil bath at 54° C. The gas inlet was connected to an automatic hydrogen-nitrogen gas dispenser manufactured by Electrosound Limited. The reaction vessel was flushed twice with nitrogen at a pressure of 4 psig, then three times with hydrogen at 4 psig, and finally the vessel was sealed and pressurised with hydrogen at the hydrogenation pressure of 4 psig. The reaction was commenced by starting the shaker and the rate of agitation adjusted to 3000 shakes per minute. The absorption of hydrogen by the reaction was displayed as a Y axis deflection on a flat bed chart recorder. Hydrogen absorption ceased after 15 minutes and, after filtration to remove catalyst, the product solution was analysed by gas-liquid chromatography. This indicated that a conversion of 2,5 dichloronitrobenzene to products of 100% had been achieved with a selectivity to the desired 2,5 dichloroaniline product of 98.7%. The 1.3% of dehalogenated products were composed of 0.4% aniline, 0.45% o-chloroaniline and 0.45% m-chloroaniline.

It is seen that catalysts according to the invention achieve consistently good results for selectivity, that is, hydrogenation without simultaneous dechlorination, compared with prior art catalysts on steam activated substrates. Furthermore, carbon activated during manufacture with phosphoric acid or a salt thereof is considerably cheaper than steam-activated charcoal. Although described with reference to a batch reaction, they are equally suited to continuous operation and in either case may be re-used many times with no loss in activity or selectivity. It will be apparent to those skilled in the art that the process is simplified compared to prior art attempts to achieve similar results in that the benefits of the catalyst and process are inherent in the catalyst; no extra additions are required to the reaction mixture or resulting separations necessitated and no complex catalyst preparations are required.

We claim:

1. A process for the hydrogenation of a halogen-substituted aromatic nitro compound substantially without simultaneous dehalogenation comprising contacting a halogen-substituted aromatic nitro compound with hydrogen at elevated temperature and pressure in the presence of a catalyst consisting essentially of from 0.1 to 10 wt % of one or more metals from the group consisting of platinum, palladium, rhodium, iridium, ruthenium and osmium supported on or impregnated into a carrier material comprising carbon activated during manufacture with phosphoric acid or a salt thereof.

2. A process according to claim 1 in which the halogen-substituted aromatic nitro compound has the general formula

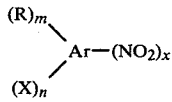

in which

Ar represents a phenyl or naphthyl aromatic radical;

X represents fluorine, chlorine and/or bromine;

R represents one or more of hydrogen, alkyl, alkoxy, hydroxy, hydroxyalkyl, carboxy, carboxyalkyl, phenyl, benzyl, sulfoxy, amino etc.;

m is a small integer, preferably 1 or 2;

n is a small integer, preferably 1 or 2, and x is a small integer, preferably 1 or 2.

3. A process according to claim 2 wherein the halogen-substituted aromatic nitro compound is selected from the group consisting of 4-chloronitrobenzene; 4-chloro-nitrotoluene; 4-chloro-2-nitro-1,3-dimethylbenzene, 4-fluoronitrobenzene; 4-bromonitrobenzene; 2,3,4-trichloronitrobenzene; 3,4-dibromonnitrobenzene; 3,4-dichloronitrobenzene; 3-chloro-4-bromonitrobenzene; 3-chloro-4-bromonitrobenzene; 2,6-dichloro-4-nitrophenol; 4-chloro-2-nitroanisole; 4-chloro-1-nitronaphthalene; 4-chloro-2,6-dinitrobenzene; 4-chloro-3,5-dinitrobenzoic acid or an ester thereof; 3-chloro-3'-nitro-diphenyl; 2-chloro-4-nitroaniline; 6-chloro-2-nitro-sodium benzoate; 4-chloro-3-nitrobenzene sodium sulfonate etc.

4. A process according to claim 1 in which the metal weight range is 0.5-5.0% of total catalyst weight.

5. A process according to claim 1 in which the elevated temperature is within the range 50°-200° C.

6. A process according to claim 1 in which the elevated pressure is greater than 1 atmosphere and less than or equal to 70 atmospheres.

7. A process according to claim 1 carried out in the absence of added solvent.

8. A process according to claim 1 carried out in the presence of added solvent.

9. A process according to claim 1 carried out in the absence of added organic or inorganic base.

10. A process according to claim 1 in which the catalyst is used as a dry powder.

11. A process according to claim 1 in which the catalyst is used as a paste.

12. A process according to claim 1 in which the weight ratio of dry catalyst to halogen-substituted aromatic nitro compound is within the range 0.01 to 10%.

13. A process according to claim 12 in which the range is 0.2 to 5%.

* * * * *